United States Patent
Tongle et al.

(10) Patent No.: US 11,095,935 B2
(45) Date of Patent: *Aug. 17, 2021

(54) CHANNEL DEBONDING OF MULTIPLE TUNERS IN DIFFERENT SET TOP BOXES

(71) Applicant: AVAGO TECHNOLOGIES INTERNATIONAL SALES PTE. LIMITED, Singapore (SG)

(72) Inventors: Anand Tongle, Richmond (CA); Rajesh Mamidwar, San Diego, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/580,745

(22) Filed: Sep. 24, 2019

(65) Prior Publication Data

US 2020/0021881 A1   Jan. 16, 2020

Related U.S. Application Data

(63) Continuation of application No. 14/921,802, filed on Oct. 23, 2015, now Pat. No. 10,469,899.

(51) Int. Cl.
*H04N 21/438* (2011.01)
*H04N 21/436* (2011.01)
(Continued)

(52) U.S. Cl.
CPC ....... *H04N 21/438* (2013.01); *H04N 21/4263* (2013.01); *H04N 21/4383* (2013.01);
(Continued)

(58) Field of Classification Search
CPC .......... H04N 21/438; H04N 21/43615; H04N 21/4383; H04N 21/4263; H04N 21/6143; H04N 21/44
See application file for complete search history.

(56) References Cited

U.S. PATENT DOCUMENTS

2003/0220072 A1   11/2003   Coffin, III
2007/0157281 A1   7/2007   Ellis et al.
(Continued)

OTHER PUBLICATIONS

Final Office Action on U.S. Appl. No. 14/921,802 dated Feb. 15, 2019.

(Continued)

*Primary Examiner* — Anthony Bantamoi
(74) *Attorney, Agent, or Firm* — Foley & Lardner LLP (57) ABSTRACT

In some aspects, the disclosure is directed to methods and systems for receiving high data transmission channels, where the system may have a first set top box and a second set top box. The first set top box may contain a tuner configured to receive via a broadcast network, a portion of a channel bonded data stream. The first set top box may also contain a network interface to a local network to send the portion to the network interface of a second set top box. The second set top box may also contain a tuner configured to receive another portion of the channel bonded data stream. The second set top box may then be configured to debond the portions received before combining the portions of the channel bonded data stream for output.

15 Claims, 7 Drawing Sheets

(51) Int. Cl.
*H04N 21/426* (2011.01)
*H04N 21/61* (2011.01)
*H04N 21/4402* (2011.01)

(52) U.S. Cl.
CPC ... *H04N 21/43615* (2013.01); *H04N 21/6143* (2013.01); *H04N 21/4402* (2013.01)

(56) References Cited

U.S. PATENT DOCUMENTS

| | | |
|---|---|---|
| 2008/0060027 A1 | 3/2008 | Yang |
| 2008/0151881 A1 | 6/2008 | Liu et al. |
| 2009/0077254 A1* | 3/2009 | Darcie ................ G06F 15/16 |
| 2010/0020794 A1 | 1/2010 | Cholas et al. |
| 2013/0132469 A1* | 5/2013 | Levicki ................ H04L 29/06 |
| 2013/0239150 A1 | 9/2013 | Chen et al. |
| 2014/0282754 A1* | 11/2014 | Rehman ................ H04N 21/61 |

OTHER PUBLICATIONS

Non-Final Office Action on U.S. Appl. No. 14/921,802 dated Apr. 20, 2017.
Non-Final Office Action on U.S. Appl. No. 14/921,802 dated Dec. 8, 2017.
Non-Final Office Action on U.S. Appl. No. 14/921,802 dated Jul. 24, 2018.
Non-Final Office Action on U.S. Appl. No. 14/921,802 dated Sep. 20, 2016.
Notice of Allowance on U.S. Appl. No. 14/921,802 dated Jun. 26, 2019.

* cited by examiner

CHANNEL DEBONDING OF MULTIPLE TUNERS IN DIFFERENT SET TOP BOXES

RELATED APPLICATIONS

This application claims the benefit of and priority as a continuation to U.S. patent application Ser. No. 14/921,802, entitled "Channel Debonding of Multiple Tuners in Different Set Top Boxes," filed Oct. 23, 2015, the entirety of which is incorporated by reference herein.

FIELD OF THE DISCLOSURE

This disclosure generally relates to systems and methods for receiving a multiple of high-bandwidth data streams. In particular, this disclosure relates to systems and methods for channel debonding of data received from multiple tuners in different set top boxes on a digital entertainment environment.

BACKGROUND OF THE DISCLOSURE

With the growing need for 4K data transmission, satellite operators are moving towards channel bonding techniques. The channel bonding techniques (such as those defined by Digital Video Broadcasting-Second Generation Extension (DVB-S2X)) allows head-end to split a high-bandwidth stream into multiple low bit rate transponders. The receivers then collect data from these multiple transponders/channels and re-assemble them and generate the high-bandwidth stream. The re-assembled high bandwidth stream is then filtered by program identifiers (PIDs) for extracting the program data.

In many implementations, only one program can be extracted from the set of tuners available on that box. This is due to channel bonding being used because of bandwidth limitations of the transponders sending the signals. Channel bonding allows for the spare capacity of the transponders to get used but results in one channel being split among multiple transponders which requires multiple tuners to receive the split data. Many homes have multiple set top boxes which are connected to each other. These boxes may have their own tuners.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

For receiving digital signal transmissions, such as ultra-HD or 4K television signals that use channel bonding, the number of tuners required in a single set top box to receive a single channel goes up. For example a set top box may require three tuners to receive a single ultra-HD channel. A set top box capable of receiving two ultra-HD channels at once would require six tuners. Many home entertainment setups already have multiple set top boxes connected together by a network (e.g. one in a living room, one in a bedroom, etc.), with each set top box having its own set of tuners. Utilizing all the available tuners on the entertainment setup allows for all the data required for two or more ultra-HD channels or other high-bandwidth channels to be received by the tuners in the various set top boxes on the network simultaneously. If one of the set top boxes is further used to debond or otherwise extract the portions of the signal received on various tuners, the reconstructed program channel can be routed over the network to any of the set top boxes to display the program on a connected television.

The following IEEE standard(s), including any draft versions of such standard(s), are hereby incorporated herein by reference in their entirety and are made part of the present disclosure for all purposes: IEEE P802.11n™; and IEEE P802.11ac™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes a home entertainment computing environment which may be useful for practicing embodiments described herein;

Section B describes embodiments of systems and methods for channel bonding of data from two or more tuners in different set top boxes on a local network; and Section C describes a network environment and computing environment which may be useful for practicing embodiments described herein.

A. Home Entertainment Computing Environment

Figure 1:
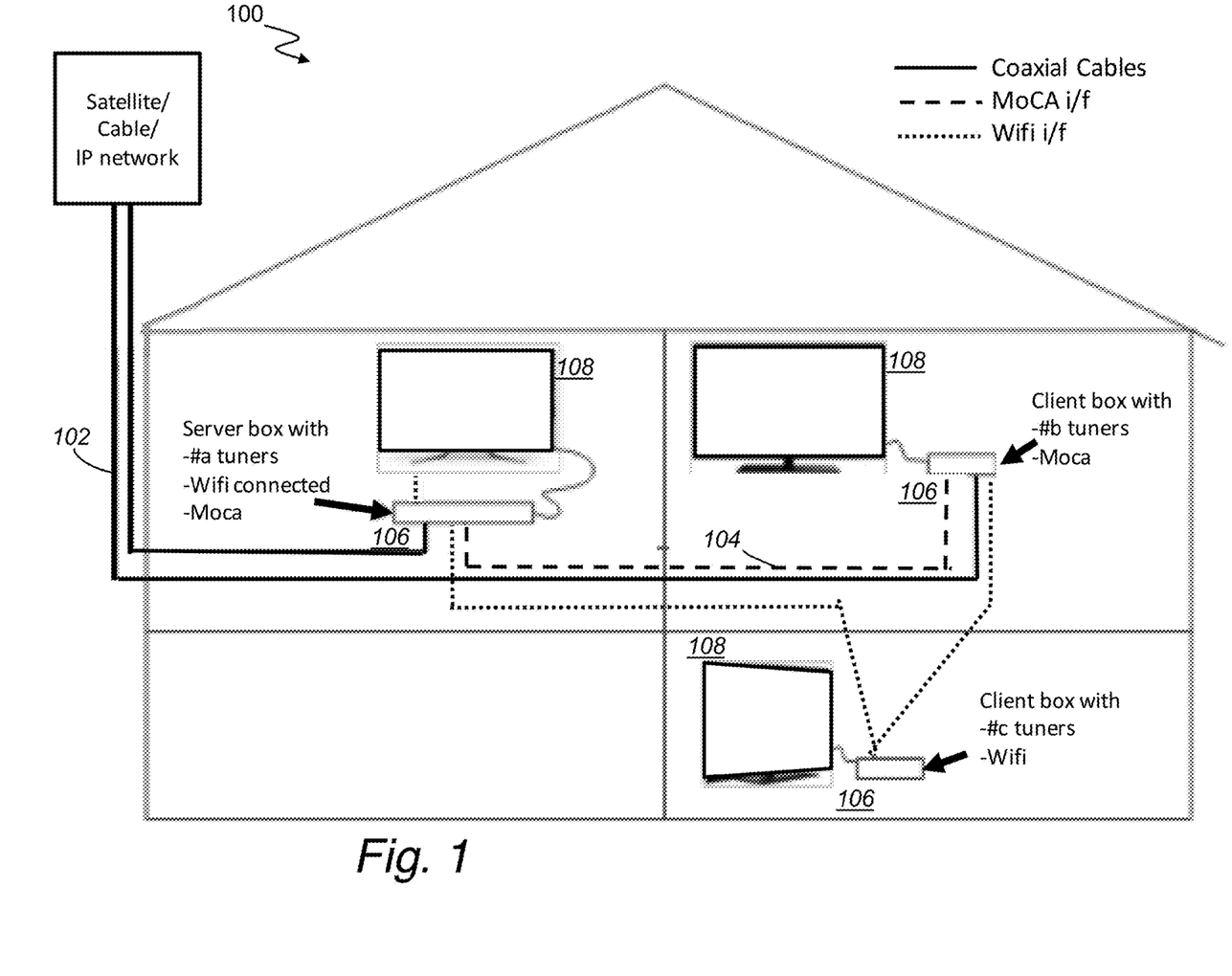
FIG. 1 is a block diagram depicting an embodiment of a home entertainment environment.

Prior to discussing the specifics of embodiments of the systems and methods of Channel Bonding of Data it may be helpful to discuss an embodiment of a home entertainment computing environment where such embodiments may be deployed. Referring now to FIG. 1A, an embodiment of a home entertainment computing environment 100 is depicted. In brief overview, the environment comprises a broadcast network 102, such as a satellite network, broadcast network, internet protocol (IP)-based network, or any other type and format of content delivery network providing a channel bonded data stream to various set top boxes 106. The set top boxes 106 are connected to a local network 104 and may also be connected to an audio/visual device 108.

The broadcast network 102 brings in a channel bonded data stream. The broadcast network 102 may run over coaxial cable, BNC cable, Ethernet cable (such as Category 5, 5e, 6, and 7 wire), fiber optic cable or other high data transfer technologies. The broadcast network 102 may be connected to a local or remote satellite dish. The broadcast network 102 may have a wired connection to a distribution cable leading to a channel bonded data stream distribution center, such as a television provider. In many implementations, broadcast network 102 may provide additional connectivity, such as data connectivity to a network such as the Internet. Accordingly, a plurality of types of data may be transferred via broadcast network 102.

The local network 104 connects the set top boxes 106 and is configured to allow data to transfer between the set top boxes 106. The local network 104 may run over coaxial cable, BNC cable, Ethernet cable (such as Category 5, 5e, 6, and 7 wire), fiber optic cable or other high data transfer technologies. The local network 104 may be a wireless network connection to one or more of the set top boxes 106. The local network 105 run over coaxial cable may be a Multimedia over Coax (MoCA) network connection. The wireless network connection may use Wi-Fi in any of its various standards. In some embodiments, set top boxes 106 may be connected via a plurality of network segments of the same or different types. For example, in one embodiment, a first set top box 106 may connect wirelessly to an access point (not illustrated), which may be connected via an Ethernet connection to a second set top box 106. Accordingly, the local network 104 may comprise one or more networks or combinations of homogenous or heterogeneous networks.

The set top boxes 106 are connected to the broadcast network 102 as well as a local network 104. The set top boxes 106 are configured to receive a channel bonded data stream or streams from the broadcast network 102. The set top boxes 106 may have the capability to receive some of the streams that together make up all the streams of the channel but not all the streams simultaneously. Alternately, the set top box 106 may have the capability to receive enough streams that together make up a single channel, but it is desirable to have two or more channels received simultaneously (e.g., required for picture-in-picture or to allow one channel to be recorded while another is being watched). For high resolution formats requiring high-bandwidth channels, as many households already have multiple set top boxes in various rooms of the house, the tuners from multiple set top boxes 106 may be used with the streams making up one or more channels distributed among the multiple set top boxes The set top boxes 106 are configured to transfer data to other set top boxes 106 over the local network 104 and the unused decoding capability of the tuners of all the set top boxes 106 is leveraged. The set top boxes 106 are configured to output audio and video information to an audio/video device 108. The connection between the set top boxes 106 and the audio/video devices 108 may be coaxial cable, BNC cable, fiber optic cable, composite cable, s-video, DVI, HDMI, component, VGA, DisplayPort, or other audio and video transfer technologies.

One or more of the set top boxes 106 may contain additional server components. The server components may allow routing of debonded data stream(s) to one or more of the other set top boxes 106 on the local network 104. The server components may also allow routing of portions of channel bonded data streams to one or more of the other set top boxes 106. For example, the set top box 106 with additional server components may be configured to route a portion of a channel bonded data stream to a set top box 106 connected to the local network 104 through a wireless connection instead of the set top box 106 receiving the portion of a channel bonded data stream on the broadcast network 102.

The audio/video devices 108 are configured to receive data from the set top boxes 106. The data may be digital or analog. The data may consist of program data or other data consisting of audio or video information. Additional or auxiliary data may be transferred along with or instead of audio and video data, including but not limited to closed captioning data, menu data, configuration data, etc.

Figure 2:
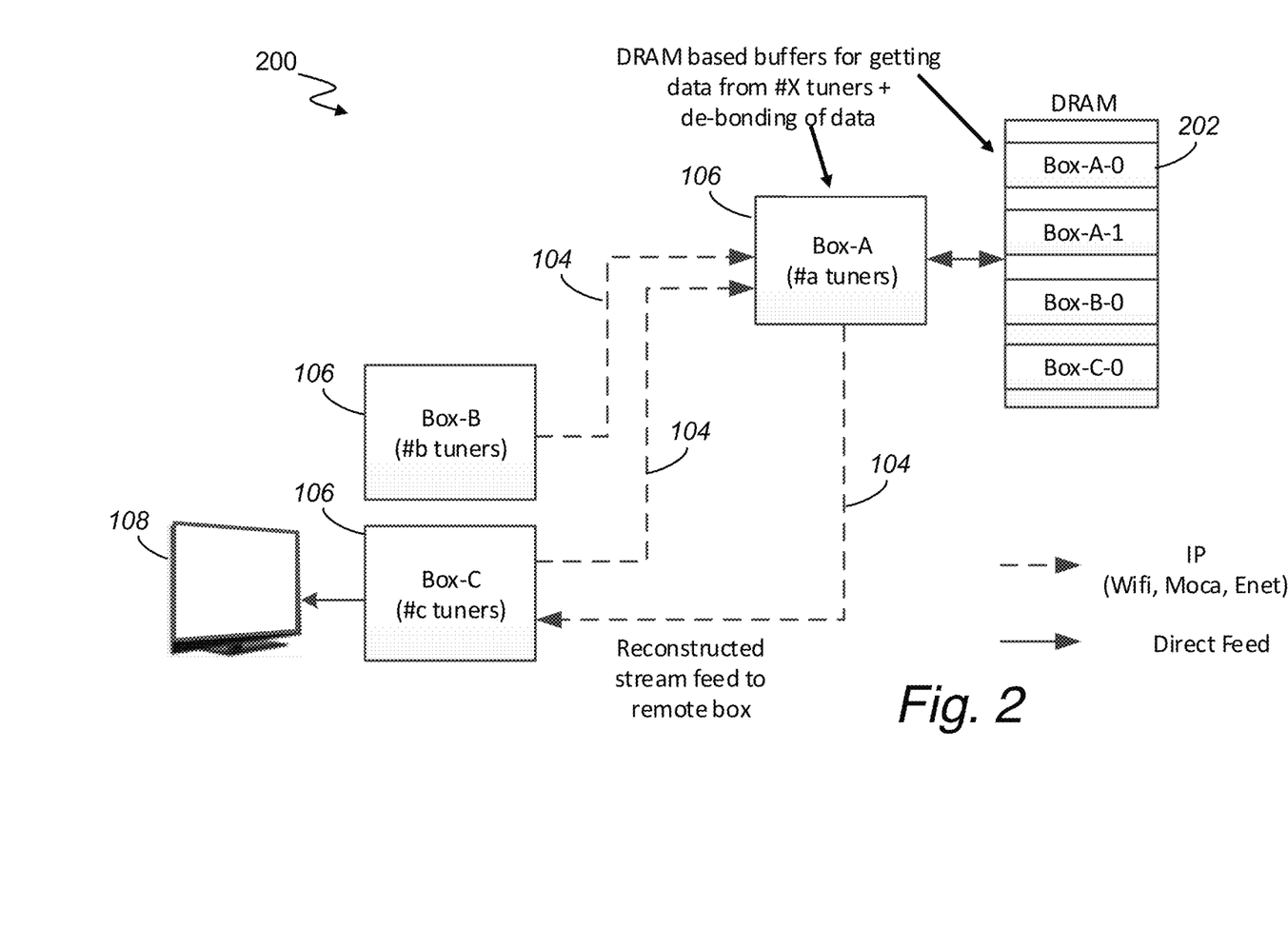
FIG. 2 is a block diagram depicting an embodiment of debonding of data obtained via tuners in set top boxes within a home entertainment environment.

It may additionally helpful to look at specifics of the environment to debond a channel bonded data stream using tuners in two or more set top boxes 106. Referring now to FIG. 2A, an embodiment of a home entertainment environment used to debond channel bonded data streams via tuners in set top boxes 106 is depicted. In brief overview, the environment comprises two or more set top boxes 106 containing tuners connected through a local network 104 and may also be connected to an audio/visual device 108. One or more of the set top boxes 106 may contain additional server components as well as memory buffers 202. As shown, in some embodiments, each set top box 106 may receive and decode a portion or subset of a multi-channel or channel bonded data stream. For example, a first set top box 106 box A may tune to, demodulate, and/or decode a first portion of a multi-channel data stream; a second set top box 106 box B may tune to, demodulate, and/or decode a second portion of the stream; and a third set top box 106 box C may tune to, demodulate, and/or decode a third portion of the stream. In some implementations, as few as two set top boxes 106 may decode portions of the stream, while in other implementations, three, four, or more set top boxes 106 may be involved in decoding portions of the data stream. In some implementations, a set top box 106 may decode a plurality of portions of the multi-channel bonded data stream. For example, a set top box 106 having picture-in-picture capability may have two tuners, and may tune and decode two portions of a multi-channel bonded data stream.

The set top boxes 106 are connected through a local network 104. The set top boxes 106 are configured to receive a channel bonded data stream or streams from the broadcast network 102. The set top boxes 106 are configured to transfer data to other set top boxes 106 over the local network 104. The set top boxes 106 are configured to output audio and video information to an audio/video device 108. Set top boxes 106 may contain one or more tuners which may be configured to separate channels from the remainder of a data stream. Set top boxes 106 may include additional components including processors, network interfaces, volatile memory, non-volatile memory, displays, and input/output ports.

One or more of the set top boxes 106 may also contain additional components configured to allow the network interface to received data from one or more tuners in other set top boxes 106. The additional components may include memory buffers 202. The memory buffers 202 may be configured to buffer the incoming portions of channel bonded data streams to allow for debonding and reassembling to a higher bandwidth data stream. The memory buffers 202 may be DRAM, SDRAM, SRAM, MRAM, RRAM, memory registers or other types of volatile or non-volatile fast memory technologies appropriate for buffering data streams. For example, as shown, a first set top box 106 box A may demodulate or decode a first portion of a multi-channel bonded data stream; and may receive a decoded second portion from a second set top box 106 box B, and a decoded third portion from a third set top box 106 box C. The first set top box 106 box A may assemble the plurality of decoded portions into a single aggregate or reconstructed data stream, such as a high resolution 4k or 8k data stream. The aggregated or reconstructed stream may be output to a display by the first set top box 106, or may be transferred to another set top box 106 for display, as shown in the example of FIG. 2 utilizing an audio/video device 108 connected to set top box 106 box C.

B. Systems and Methods for Channel Debonding of Data

Figure 3:
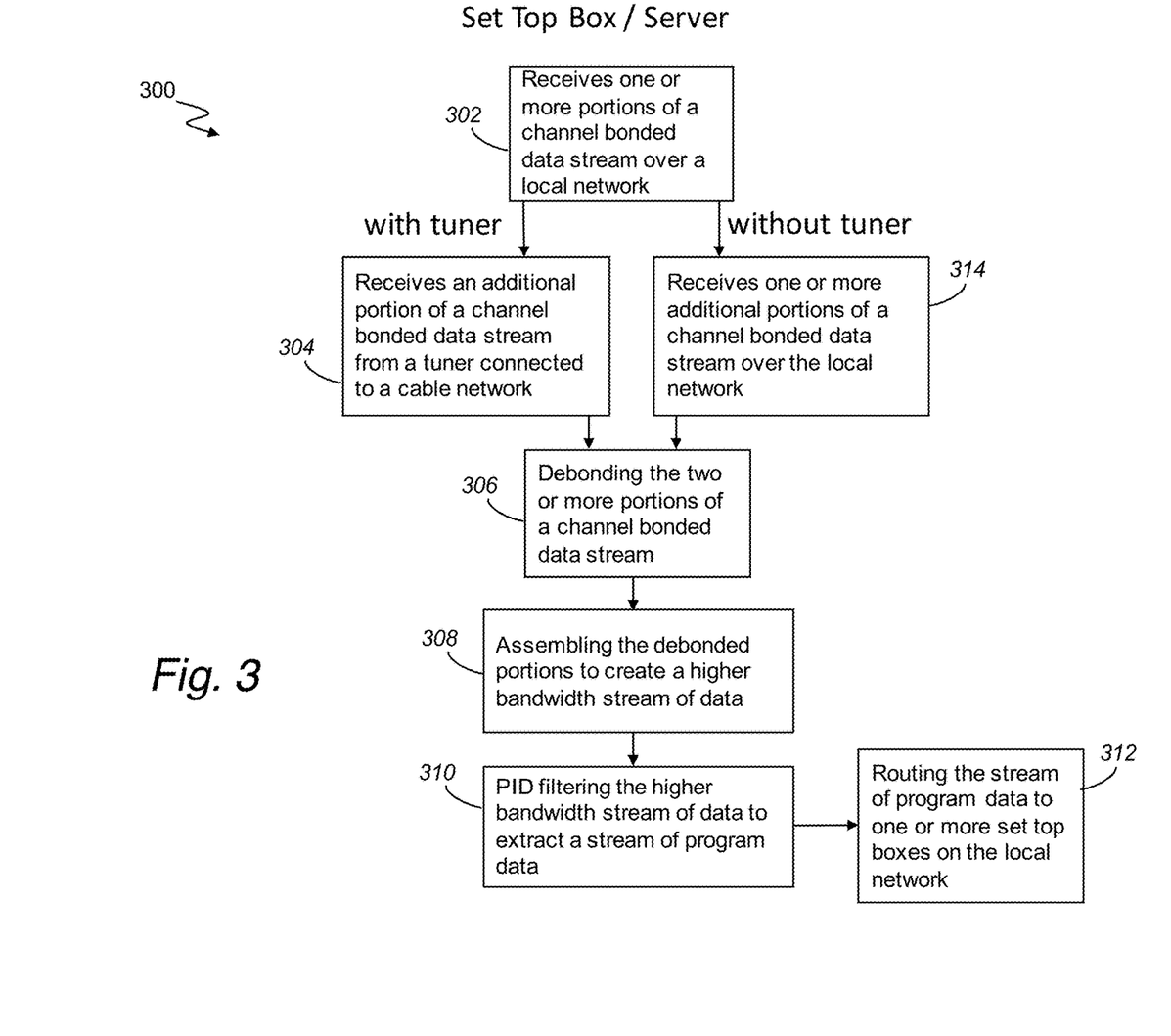
FIG. 3 is a block diagram depicting an embodiment of approaches to extracting streams of program data from portions of channel bonded data streams on a set top box/server.

Referring now to FIG. 3A, flow diagram of a method for receiving and debonding portions of a channel bonded data stream 300 at a set top box 106 containing server components is depicted. At step 302, the set top box 106 receives one or more portions of a channel bonded data stream over a local network 104. At step 304, in a set top box 106 that also contains its own tuner(s), the set top box 106 receives an additional portion of a channel bonded data stream from its own tuner connected to a broadcast network 102. At step 306, the set top box 106 debonds the two or more portions of the channel bonded data stream. At step 308, the set top box 106 reassembles the debonded portions of the channel bonded data stream to create a higher bandwidth data stream. At step 310, the set top box 106, may if needed, PID filter the higher bandwidth data stream to extract a program data stream. At step 312, the set top box 106, may if needed route the stream of program data to one of the other one or more set top boxes 106 on the local network 104. Returning to step 314, if the set top box 106 does not contain its own tuners, one or more additional portions of a channel bonded data stream may add to the one or more portions of step 302 where all the portions of channel bonded data streams are received over the local network 104.

In further details of step 302, the one or more portions of a channel bonded data stream received over a local network 104 may be received on the network interface. The portions may be received over a wired connection or a wireless connection. The one or more portions may be in the form a digital stream comprising packets.

In further details of step 304, the set top box 106 with server components may receive an additional portion of a channel bonded data stream over one or more tuners in the set top box 106 with server components. The one or more tuners may be connected to the broadcast network 102. Alternatively, one or more tuners may be present in the set top box 106 with server components but all the portions of a the channel bonded data stream are received over the local network 104 from other set top boxes 106 on the network.

In further details of step 306, the set top box 106 with server components debonds the two or more portions of channel bonded data stream. The two or more portions may come from any of the tuners connected to a broadcast network 102, if any, in the set top box 106 with server components or over the local network 104 from other set top boxes 106 on the network. Alternatively, the channels may be debonded in the one or more set top boxes 106 on the local network 104 with the set top box 106 with server components receiving the portions of channel bonded data streams from the one or more set top boxes 106 already debonded. The set top box 106 with server components may also have the ability to generate locked timestamps to use in assembling the portions.

In further details of step 308, the set top box 106 with server components assembles the debonded portions to create a higher bandwidth stream of data. The assembly may take into account the total time spent by packets in the transmission network and home network to ensure that it is less than the rollover time of the bonding parameters, e.g. ISSY in case of DVB-S2X systems or sequence numbers in transponder bonding. One technique may include chunks of packets defined by marker packets with the sequence numbers in the marker packets. In one embodiment, the maximum number of packets between the marker packets may be 256 and with a maximum 40 Mbps data rate, the total time between the marker packets may be 10*188 bytes/packet*98*(25 nanoseconds)=0.376 milliseconds. In the embodiment, the total time for rollover of sequence numbers would be 2*32*0.376 msec=24 milliseconds. As this time is larger than the skew and jitter introduced by home networks, the data collected may be re-sequentialized. In another embodiment, the rollover time of the bonding parameter may be approximately 50 msec for 5 Mbaud/sec and worst case MODCOD. NTP time stamps may be used to ensure that the chunks are aligned according to the correct order of the ISSY. Since the NTP timestamps have rollover measured in years, if NTP protocol is being used by the network devices, the devices can retain and use the 64-bit reference timestamps.

In further details of step 310, the set top box 106 with server components may apply PID filtering to the assembled higher bandwidth stream of data to extract a stream of program data. Alternatively, the set top box 106 with server components may instead output the higher bandwidth stream of data without PID filtering.

In further details of step 312, the set top box 106 with server components may route the stream of program data to one or more set top boxes 106 via the local network 104. The set top box 106 with server components may also instead send the stream of program data to an audio/visual device 108 operably connected to it. Alternatively, the set top box 106 may instead route the higher bandwidth stream of data to one or more set top boxes 106 via the local network 104 without first applying PID filtering where the one or more set top boxes 106 may apply PID filtering to extract a stream of program data.

In further details of step 314, the set top box 106 with server components may receive an all the portions of a channel bonded data stream via the local network 104 from one or more set top boxes 106.

Figure 4:
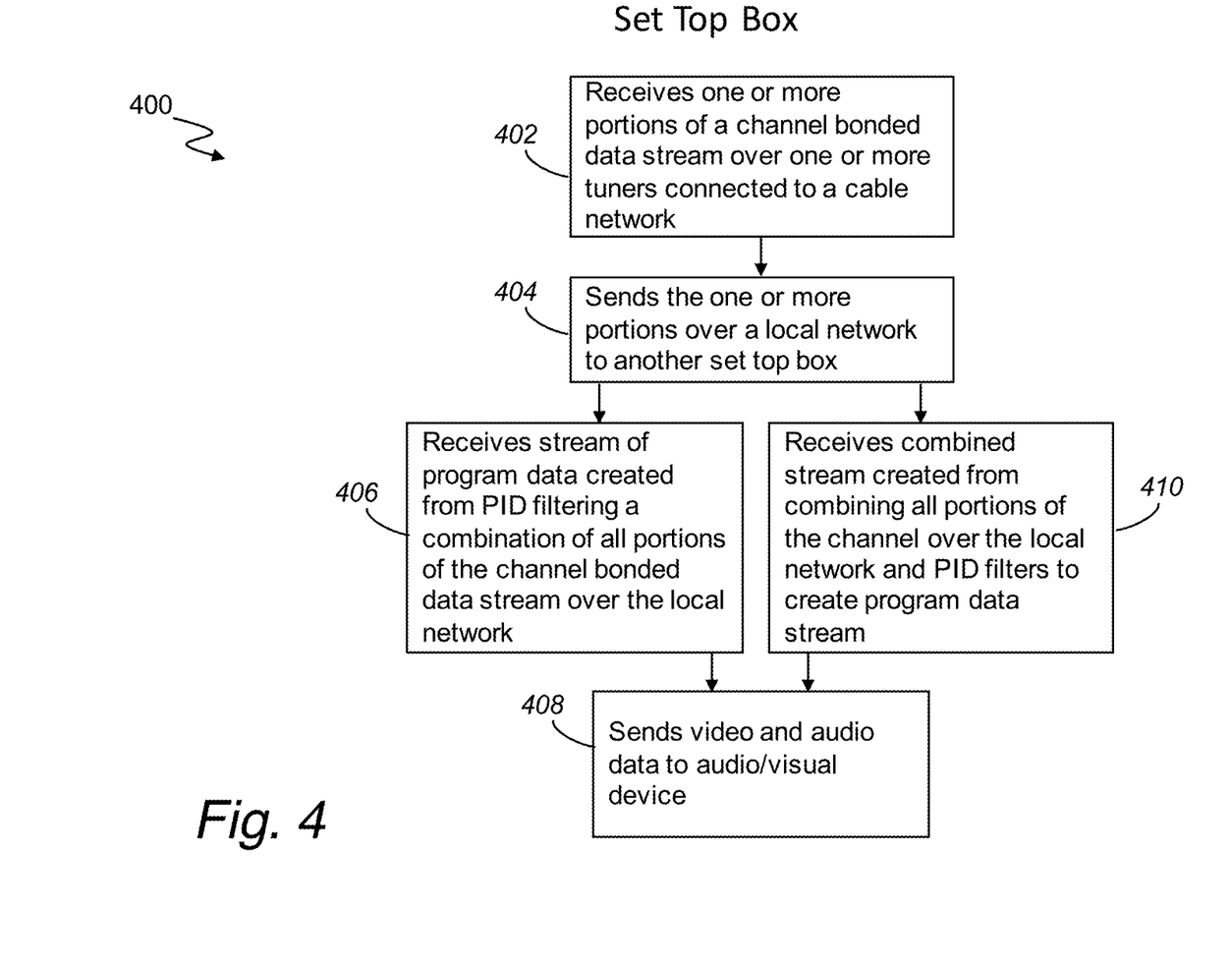
FIG. 4 is a block diagram depicting an embodiment of approaches to receiving portions of a channel bonded data stream on a set top box.

Referring now to FIG. 4A, a flow diagram of a method for receiving portions of channel bonded data and sending them to be debonded 400 at a set top box 106 is depicted. At step 402, the set top box 106 receives one or more portions of a channel bonded data stream using one or more tuners, the tuners connected to a broadcast network 102. At step 404, the set top box 106 sends the one or more portions of a channel bonded data stream over the local network 104 to another set top box 106. At step 406, the set top box 106 receives a stream of program data created from combining all relevant portions of the channel bonded data stream, the combination having been PID filtered, over the local network 104. At step 408, the set top box 106 uses the program data to send video and audio data to an audio/visual device 108, such as an entertainment system. Returning to step 410, alternately, the set top box 106 may receive the combined stream created from combining all relevant portions of the channel bonded data stream and PID filter the stream to create the program data stream that is then used to send video and audio data to an audio/visual device 108 at step 408.

In further details of step 402, the set top box 106 receives one or more portions of a channel bonded data stream using one or more tuners, the tuners connected to a broadcast network 102. Alternatively, the set top box 106 may be wireless and not have a direct connection to a broadcast network 102 or not have a direct connection to a broadcast network 102 but have a connection to the local network 104. The set top box 106 may then receive data to extract one or more portions of a channel bonded data stream over a network interface from the local network 104.

In further details of step 404, the set top box 106 sends the one or more portions of a channel bonded data stream to another set top box 106 via the local network 104. The one or more portions may be sent on a wired or wireless connection to the local network 104. Alternatively, the set top box 106 may debond the one or more portions of the channel bonded data stream before sending the debonded portions to another set top box 106 via the local network 104.

In further details of step 406, the set top box 106 may receive a stream of PID filtered program data created from a combination of all portions of the channel bonded data stream needed to create the stream of program data. The stream of program data may be received on a wired or wireless connection to the local network 104.

In further details of step 408, the set top box 106 may send the video and audio data from the stream of program data to an audio/visual device 108. The video and audio data may be in analog or digital form. The set top box 106 may compress or otherwise change the formatting of the stream of program data to make it suitable for output to the audio/visual device 108.

In further details of step 410, the set top box 106 may receive a higher bandwidth stream of data created from a combination of all portions of the channel bonded data stream needed to create a stream of program data. The set top box 106 may then PID filter the incoming stream to create the stream of program data. The stream of higher bandwidth data may be received on a wired or wireless connection to the local network 104.

In an embodiment of a system for receiving high data transmission channels, the system may have a first set top box and a second set top box. The first set top box may contain a tuner configured to receive via a broadcast network, a portion of a channel bonded data stream. The first set top box may also contain a network interface to a local network to send the portion to the network interface of a second set top box. The second set top box may also contain a tuner configured to receive another portion of the channel bonded data stream. The second set top box may then be configured to combine the portions of the channel bonded data stream for output.

The embodiment of a system for receiving high data transmission channels may also include the second set top box containing a mass storage device and a network router. The second set top box may be further configured to debond the received portions before combining the portions and use the network router to route the combination of the debonded portions to another set top box via the local network.

The system embodiment may also require the total time spent by packets of the channel bonded data stream traversing the transmission network and the local network to be less than the rollover time of bonding parameters associated with the channel bonded data.

The embodiment of the system may assemble the debonded channel bonded data data streams by having the packets of the channel bonded data be defined by marker packets comprising sequence numbers used by the server in creation of the combination of portions. Alternately the packets of the channel bonded data are associated with chunks of data each with an associated timestamp, wherein the server box uses the timestamps in creation of the combination of portions.

The embodiment of the system may be configured to have the combination of portions result in a program stream and the second set top box routes the program stream to another set top box via the local network. The system may also be configured for the second set top box to receive a plurality of portions of channel bonded data streams via the local network from a plurality of set top boxes and debond the plurality of portions of channel bonded data streams to create a plurality of program streams. The second set top box may then route a first program stream from the plurality of program streams to a first set top box of the plurality of set top boxes and a second program stream from the plurality of program streams to a second set top box of the plurality of set top boxes.

In an embodiment of a method for receiving high data transmission channels, the method may include receiving by a first set top box a plurality of portions of channel bonded data streams over a local network from a plurality of set top boxes, debonding the plurality of portions of channel bonded data streams to create a plurality of debonded channel data streams, assembling the plurality of debonded channel data streams to create an assembled data stream, and PID filtering the assembled data stream to extract a program data stream. The method may further include routing the program data stream to one of the plurality of set top boxes.

The embodiment of the method may require the total time spent by packets of each of the plurality of portions of channel bonded data streams traversing the transmission network and the local network to be less than the rollover time of bonding parameters associated with the channel bonded data.

The embodiment of the method may have portions of the channel bonded data streams defined by marker packets comprising sequence numbers to assist during the creation of the assembled data stream. Alternatively the method may have packets of the portions of the channel bonded data streams that are associated with chunks of data each with an associated timestamp to assist during the creation of the assembled data stream.

The embodiment of the method may further include during the assembling step, assembling the plurality of debonded channel data streams to create a plurality of assembled data streams, and during the PID filtering step PID filtering the plurality of assembled data streams to extract a plurality of program data streams, and having the method further include routing each of the plurality of program data streams.

Another embodiment of a method may include receiving, by a first set top box from a broadcast network, a first portion of a channel bonded data stream using a tuner, transmitting, by the first set top box via a local network to a server, the first portion of channel bonded data stream, and receiving, by the first set top box via the local network from the server, an assembled data stream comprising the first portion of the channel bonded data stream and a second portion of the channel bonded data stream received by a second set top box and provided to the server for assembly. The second set top box may debond the channel bonded data streams before assembling into an assembled data stream. The second set top box may PID filter the assembled data stream to create a program data stream. Alternatively, the PID filtering may be done by the second set top box upon receiving the assembled data stream.

Another embodiment of a system may use a number of tuners form a pool of available tuners connected on a local network to tune to bonded channels. A set top box configured to receive the data from the pool of tuners via IP carries out the debonding and generates locked timestamps. The set top box is configured to use the local network to rout the reconstructed program stream to any device.

C. Computing and Network Environment

Figure 5A:
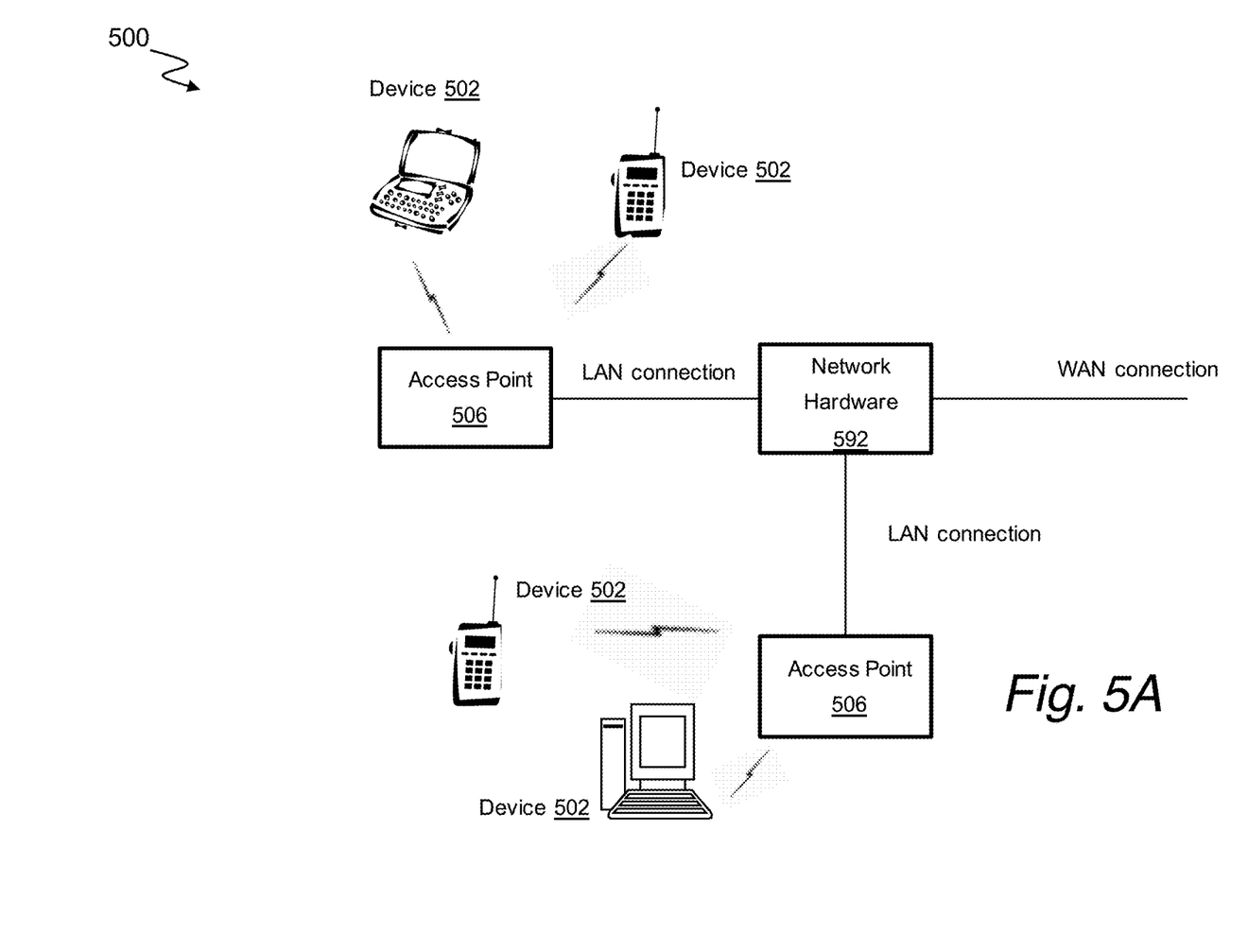
FIG. 5A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 5A, an embodiment of a network environment is depicted. In brief overview, the network environment includes a wireless communication system that includes one or more access points 506, one or more wireless communication devices 502 and a network hardware component 592. The wireless communication devices 502 may for example include laptop computers 502, tablets 502, personal computers 502 and/or cellular telephone devices 502. The details of an embodiment of each wireless communication device and/or access point are described in greater detail with reference to FIGS. 5B and 5C. The network environment can be an ad hoc network environment, an infrastructure wireless network environment, a subnet environment, etc. in one embodiment.

The access points (APs) 506 may be operably coupled to the network hardware 592 via local area network connections. The network hardware 592, which may include a router, gateway, switch, bridge, modem, system controller, appliance, etc., may provide a local area network connection for the communication system. Each of the access points 506 may have an associated antenna or an antenna array to communicate with the wireless communication devices 502 in its area. The wireless communication devices 502 may register with a particular access point 506 to receive services from the communication system (e.g., via a SU-MIMO or MU-MIMO configuration). For direct connections (e.g., point-to-point communications), some wireless communication devices 502 may communicate directly via an allocated channel and communications protocol. Some of the wireless communication devices 502 may be mobile or relatively static with respect to the access point 506.

In some embodiments an access point 506 includes a device or module (including a combination of hardware and software) that allows wireless communication devices 502 to connect to a wired network using Wi-Fi, or other standards. An access point 506 may sometimes be referred to as an wireless access point (WAP). An access point 506 may be configured, designed and/or built for operating in a wireless local area network (WLAN). An access point 506 may connect to a router (e.g., via a wired network) as a standalone device in some embodiments. In other embodiments, an access point can be a component of a router. An access point 506 can provide multiple devices 502 access to a network. An access point 506 may, for example, connect to a wired Ethernet connection and provide wireless connections using radio frequency links for other devices 502 to utilize that wired connection. An access point 506 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 506 may be used for (e.g., in-home or in-building) wireless networks (e.g., IEEE 802.11, Bluetooth, ZigBee, any other type of radio frequency based network protocol and/or variations thereof). Each of the wireless communication devices 502 may include a built-in radio and/or is coupled to a radio. Such wireless communication devices 502 and/or access points 506 may operate in accordance with the various aspects of the disclosure as presented herein to enhance performance, reduce costs and/or size, and/or enhance broadband applications. Each wireless communication devices 502 may have the capacity to function as a client node seeking access to resources (e.g., data, and connection to networked nodes such as servers) via one or more access points 506.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 5B:
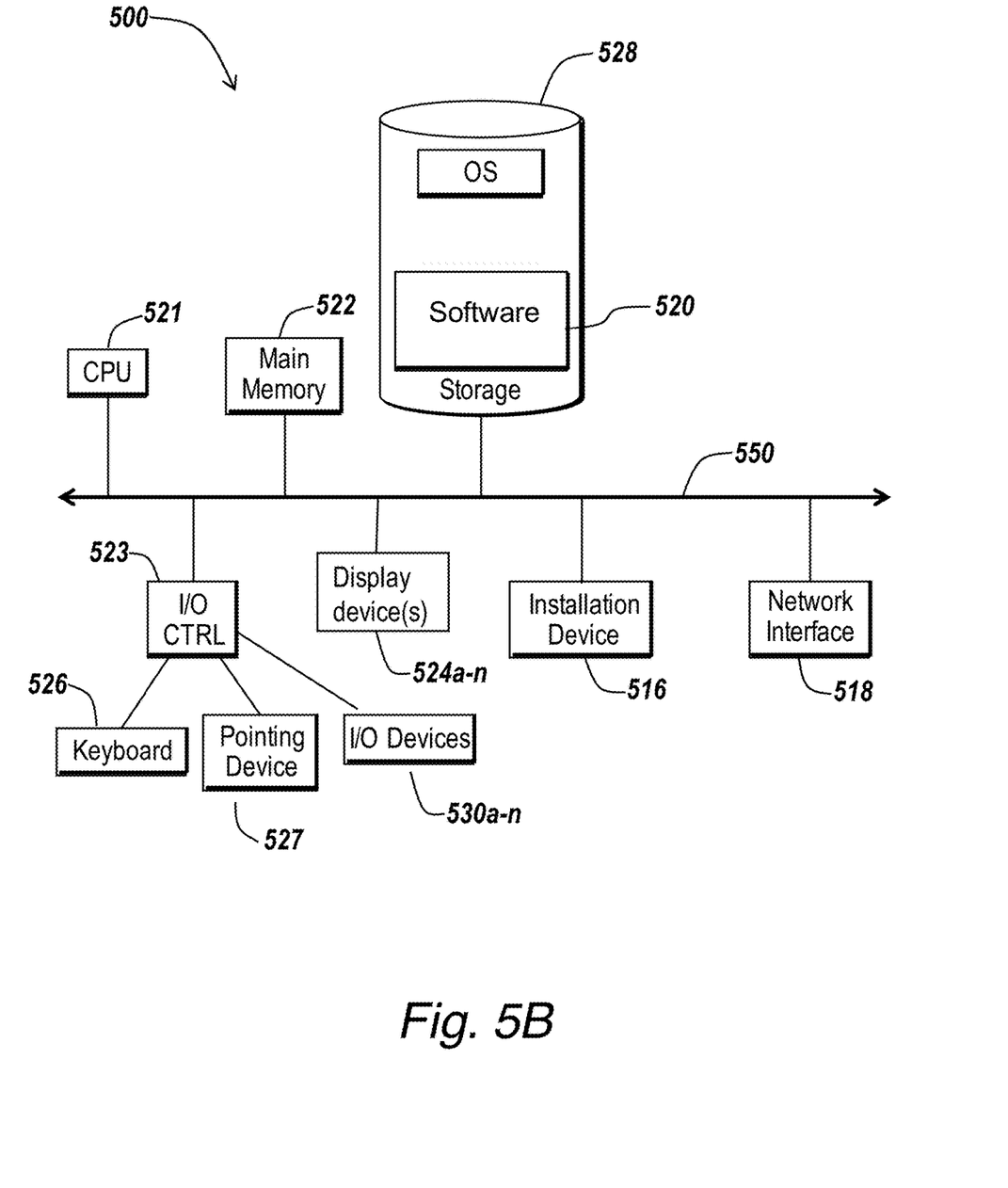
FIGS. 5B and 5C are block diagrams depicting embodiments of computing devices useful in connection with the methods and systems described herein.
Figure 5C:
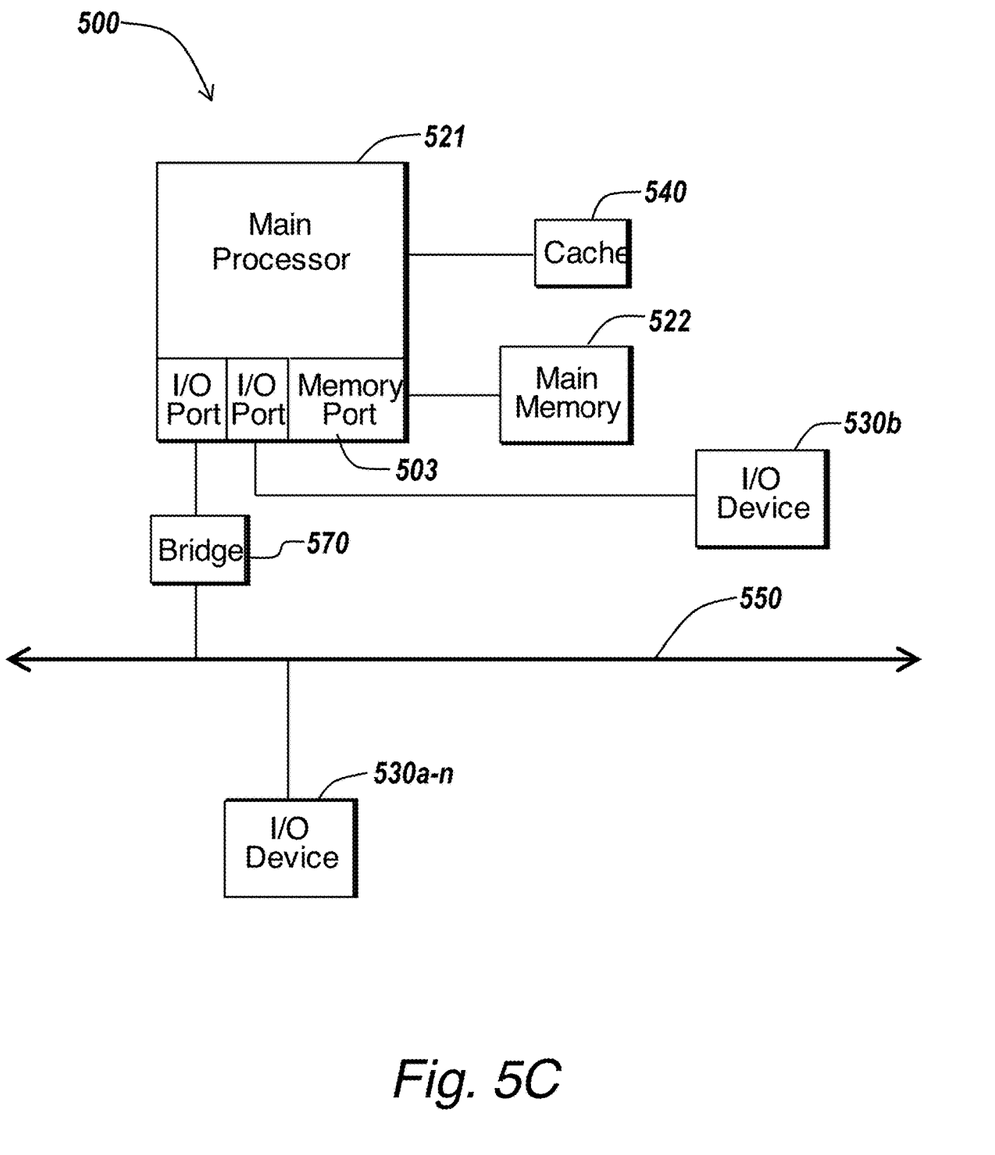

The communications device(s) 502 and access point(s) 506 may be deployed as and/or executed on any type and form of computing device, such as a computer, network device or appliance capable of communicating on any type and form of network and performing the operations described herein. FIGS. 5B and 5C depict block diagrams of a computing device 500 useful for practicing an embodiment of the wireless communication devices 502 or the access point 506. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-624n, a keyboard 526 and a pointing device 527, such as a mouse. The storage device 528 may include, without limitation, an operating system and/or software. As shown in FIG. 5C, each computing device 500 may also include additional optional elements, such as a memory port 503, a bridge 570, one or more input/output devices 530a-530n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 500 may be based on any of these processors, or any other processor capable of operating as described herein.

Main memory unit 522 may be one or more memory chips capable of storing data and allowing any storage location to be directly accessed by the microprocessor 521, such as any type or variant of Static random access memory (SRAM), Dynamic random access memory (DRAM), Ferroelectric RAM (FRAM), NAND Flash, NOR Flash and Solid State Drives (SSD). The main memory 522 may be based on any of the above described memory chips, or any other available memory chips capable of operating as described herein. In the embodiment shown in FIG. 5B, the processor 521 communicates with main memory 522 via a system bus 550 (described in more detail below). FIG. 5C depicts an embodiment of a computing device 500 in which the processor communicates directly with main memory 522 via a memory port 503. For example, in FIG. 5C the main memory 522 may be DRDRAM.

FIG. 5C depicts an embodiment in which the main processor 521 communicates directly with cache memory 540 via a secondary bus, sometimes referred to as a backside bus. In other embodiments, the main processor 521 communicates with cache memory 540 using the system bus 550. Cache memory 540 typically has a faster response time than main memory 522 and is provided by, for example, SRAM, BSRAM, or EDRAM. In the embodiment shown in FIG. 5C, the processor 521 communicates with various I/O devices 530 via a local system bus 550. Various buses may be used to connect the central processing unit 521 to any of the I/O devices 530, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computer 500 in which the main processor 521 may communicate directly with I/O device 530*b*, for example via HYPERTRANSPORT, RAPIDIO, or INFINIBAND communications technology. FIG. 5C also depicts an embodiment in which local busses and direct communication are mixed: the processor 521 communicates with I/O device 530*a* using a local interconnect bus while communicating with I/O device 530*b* directly.

A wide variety of I/O devices 530*a*-530*n* may be present in the computing device 500. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 523 as shown in FIG. 5B. The I/O controller may control one or more I/O devices such as a keyboard 526 and a pointing device 527, e.g., a mouse or optical pen. Furthermore, an I/O device may also provide storage and/or an installation medium 516 for the computing device 500. In still other embodiments, the computing device 500 may provide USB connections (not shown) to receive handheld USB storage devices such as the USB Flash Drive line of devices manufactured by Twintech Industry, Inc. of Los Alamitos, Calif.

Referring again to FIG. 5B, the computing device 500 may support any suitable installation device 516, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 500 may further include a storage device, such as one or more hard disk drives or redundant arrays of independent disks, for storing an operating system and other related software, and for storing application software programs such as any program or software 520 for implementing (e.g., configured and/or designed for) the systems and methods described herein. Optionally, any of the installation devices 516 could also be used as the storage device. Additionally, the operating system and the software can be run from a bootable medium.

Furthermore, the computing device 500 may include a network interface 518 to interface to the network 504 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may include a built-in network adapter, network interface card, PCMCIA network card, card bus network adapter, wireless network adapter, USB network adapter, modem or any other device suitable for interfacing the computing device 500 to any type of network capable of communication and performing the operations described herein.

In some embodiments, the computing device 500 may include or be connected to one or more display devices 524*a*-524*n*. As such, any of the I/O devices 530*a*-530*n* and/or the I/O controller 523 may include any type and/or form of suitable hardware, software, or combination of hardware and software to support, enable or provide for the connection and use of the display device(s) 524*a*-524*n* by the computing device 500. For example, the computing device 500 may include any type and/or form of video adapter, video card, driver, and/or library to interface, communicate, connect or otherwise use the display device(s) 524*a*-524*n*. In one embodiment, a video adapter may include multiple connectors to interface to the display device(s) 524*a*-524*n*. In other embodiments, the computing device 500 may include multiple video adapters, with each video adapter connected to the display device(s) 524*a*-524*n*. In some embodiments, any portion of the operating system of the computing device 500 may be configured for using multiple displays 524*a*-524*n*. One ordinarily skilled in the art will recognize and appreciate the various ways and embodiments that a computing device 500 may be configured to have one or more display devices 524*a*-524*n*.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 500 of the sort depicted in FIGS. 5B and 5C may operate under the control of an operating system, which control scheduling of tasks and access to system resources. The computing device 500 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WIN- DOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 500 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 500 has sufficient processor power and memory capacity to perform the operations described herein.

In some embodiments, the computing device 500 may have different processors, operating systems, and input devices consistent with the device. For example, in one embodiment, the computing device 500 is a smart phone, mobile device, tablet or personal digital assistant. In still other embodiments, the computing device 500 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 500 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

We claim:

1. A system for receiving high data transmission channels, comprising:
    a first set top box comprising:
        a tuner configured to receive, via a broadcast network, a first portion of a channel bonded data stream; and
        a network interface configured to:
        receive, via a local network, a second portion of the channel bonded data stream from a second set top box, and route a combined program stream to another set top box via the local network, the first set top box generating the combined program stream from the first portion and second portion of the channel bonded data stream, wherein a total time spent by at least one packet of the channel bonded data stream traversing the transmission network and the local network is greater than a rollover time of an input stream synchronization (ISSY) parameter, and wherein the first set top box is configured to re-sequentialize the packets of the channel bonded data stream according to network time protocol (NTP) timestamps associated with the packets.

2. The system of claim 1 wherein the first set top box further comprises:
    a mass storage device; and
    a network router;
    wherein the first set top box is configured to debond the received portions before combining the portions and use the network router to route the combination of the debonded portions to another set top box via the local network.

3. The system of claim 1, wherein the packets of the channel bonded data are defined by marker packets comprising sequence numbers used in combining the first portion and the second portion.

4. The system of claim 1, wherein the another set top box is the second set top box.

5. The system of claim 1, wherein the first set top box is further configured to receive, via the network interface, a plurality of portions of channel bonded data streams via the local network from a plurality of set top boxes and debond the plurality of portions of channel bonded data streams to create a plurality of program streams.

6. A method of receiving high data transmission channels comprising:
- receiving, by a first set top box, a first portion of a channel bonded data stream via a tuner of the first set top box, and a second portion of the channel bonded data stream from a second set top box via a local network, wherein a total time spent by at least one packet of the channel bonded data stream traversing the transmission network and the local network is greater than a rollover time of an input stream synchronization (ISSY) parameter;
- re-sequentializing, by the first top box, packets of the channel bonded data stream according to network time protocol (NTP) timestamps associated with the packets;
- combining, by the first set top box, the first portion and second portion of the channel bonded data stream into a combined program stream; and
- routing, by the first set top box via the local network, the combined program stream to another set top box.

7. The method of claim 6, further comprising debonding the first portion and second portion before combining the first portion and second portion and routing the combination of the debonded portions to the another set top box via the local network.

8. The method of claim 6, wherein the packets of the channel bonded data are defined by marker packets comprising sequence numbers used in combining the first portion and the second portion.

9. The method of claim 7, wherein the another set top box is the second set top box.

10. The method of claim 7, further comprising receiving, via the local network, a plurality of portions of channel bonded data streams from a plurality of set top boxes; and debonding the plurality of portions of channel bonded data streams to create a plurality of program streams.

11. A method of contributing to receiving high data transmission channels comprising:
- receiving, by a first set top box from a broadcast network, a first portion of a channel bonded data stream using a tuner, wherein a total time spent by at least one packet of the channel bonded data stream traversing the transmission network and the local network is greater than a rollover time of an input stream synchronization (ISSY) parameter;
- re-sequentializing, by the first set top box, packets of the channel bonded data stream according to network time protocol (NTP) timestamps associated with the packets;
- transmitting, by the first set top box via a local network to a second set top box, the first portion of channel bonded data stream; and
- receiving, by the first set top box via the local network from the second set top box, an assembled data stream comprising the first portion of the channel bonded data stream and a second portion of the channel bonded data stream received by a second set top box and provided to the server for assembly.

12. The method of claim 11, wherein the first portion of a channel bonded data stream is debonded by the second set top box.

13. The method of claim 11, wherein packets of the first portion of the channel bonded data stream are defined by marker packets comprising sequence numbers used in combining the first portion and the second portion.

14. The method of claim 11, wherein the timestamps are used in combining the first portion and the second portion.

15. The method of claim 11, further comprising filtering the program identifiers of the received assembled data stream.

* * * * *